2,899,300

METHOD FOR EXTRACTING NICKEL FROM LATERITE ORES

Richard Porter Bailey, Ottawa, Ontario, Canada, assignor to Quebec Metallurgical Industries Ltd., Ottawa, Ontario, Canada, a corporation of Canada No Drawing. Application November 5, 1957
Serial No. 694,522

6 Claims. (Cl. 75—101)

The present invention relates to the treatment of nickel laterite ores which are oxidic complexes, at least partly in hydrated form, containing small amounts of nickel, cobalt and manganese and substantially larger amounts of iron, silica and magnesia. A New Caledonian nickel laterite ore is illustrative. A typical New Caledonian nickel laterite ore, after drying, comprises by weight 2.62 percent nickel, 0.06 percent cobalt, 0.26 percent manganese, chromium 1.0 percent, alumina 1.1 percent, 12.0 percent iron, 22.7 percent magnesia, 39.6 percent silica and 11.3 percent loss on ignition. The amounts of these components vary somewhat with the source of the ore. The invention particularly contemplates a method of treating such ores to obtain a concentrate containing a content of nickel plus cobalt of the order of 30 to 40 percent by weight which can be treated by conventional means for the recovery of nickel and cobalt.

The present invention provides a method for sulphating the nickel laterite ore at low temperatures in a short period of time and takes advantage of the fact that the oxidic complex ore is at least partly in hydrated form and thus is more susceptible to attack by sulphuric acid at low temperatures than if in the anhydrous state. In addition to the recovery of a concentrate containing nickel plus cobalt of the order of 30 to 40 percent, the method of the invention makes possible the recovery of magnesium from the ore in the form of magnesia, part of which may be used in carrying out the method of the invention. The method also makes possible the recovery of most of the sulphuric acid used. These factors render the method very economical.

In accordance with one method of practising the invention the ore is subjected to one or more sulphating operations in each of which the ore in finely divided form is intimately mixed with an amount of an aqueous solution of sulphuric acid about sufficient to saturate the ore and the acid saturated ore is dried by baking at a temperature above 100° C. but below 150° C. until the material has been dried sufficiently to permit crushing and pulverizing. The total amount of sulphuric acid used is not greater than about 80 percent of the amount theoretically required to convert all the metal values of the ore to sulphates. The sulphated ore then is leached with water or an aqueous solution of magnesium sulphate to obtain a leach solution and a leach residue. Reactive magnesia then is added to the leach solution to bring its pH value to between about 3.5 to about 4.2 to precipitate ferric iron. After removing the precipitate, reactive magnesia is added to the remaining solution to bring its pH value up to about 8.2 to precipitate substantially all its nickel and cobalt contents. After removing the nickel and cobalt precipitate, magnesium sulphate may be recovered from the stripped liquor. The magnesium sulphate then may be decomposed to recover magnesia and sulphur dioxide.

More efficient use of sulphuric acid and a higher recovery of nickel and cobalt may be obtained by a modification of the above described method. Thus, a batch of ore is treated by the above described cycle of steps, for convenience referred to as the principal cycle of steps, to obtain a leach residue containing some metal values which have not been converted to sulphates. This leach residue is dried and subjected to at least one sulphating operation in which such residue in finely divided form is intimately mixed with an amount of an aqueous solution of sulphuric acid about sufficient to saturate the leach residue and the acid saturated residue is dried by baking at a temperature above 100° C. but below 150° C. until the material has been dried sufficiently to permit crushing. The amount of sulphuric acid used is slightly greater, about 10 to 20 percent greater, than the amount theoretically required to convert to sulphates the metal values in the residue which had not previously been converted to sulphates. The sulphated leach residue then is leached with water and a leach solution recovered consisting essentially of water containing some unreacted sulphuric acid and dissolved sulphates of iron, nickel, cobalt, manganese and magnesium. This leach solution is partially evaporated and cooled to precipitate some sulphates of iron, magnesium and nickel. After removing the precipitated sulphates, the concentrated acidic solution is mixed with sulphuric acid and the mixture is used as the sulphating agent for sulphating a second batch of ore, the second batch of ore being otherwise treated by the above described principal cycle of steps.

More specifically, in one practice of the invention, the ore is crushed to about minus 14 mesh and, preferably, not coarser than minus 10 mesh. The finely divided ore is intimately mixed with an amount of a first aqueous solution of sulphuric acid so that the ore will retain sufficient consistency to permit ready mechanical handling when thoroughly saturated with the aqueous solution. The thus saturated ore then is dried by baking at a temperature above 100° C. but below 150° C., preferably about 125° C., so that evaporation of water will not be too rapid. This baking is continued until the material has been dried sufficiently to permit crushing and pulverizing, usually about 4 to 8 hours. The baked material is crushed, preferably to about minus 10 mesh. The finely divided material then is intimately mixed with a second amount of an aqueous solution of sulphuric acid to saturate it while retaining a firm consistency for ready handling. Then it is again baked as above described until it is dried sufficiently for ready handling. The total amount of acid used should not exceed about 80 percent of that theoretically required to convert all the metal values of the ore to sulphate. About two thirds of the total amount of acid is used in the first aqueous solution and one third in the second aqueous solution. Thus, the acid strength of the first aqueous solution is about 50° Bé. and the second about 37° Bé. As a result of these acid baking steps any silicic acid formed by decomposition of the silicate ore is almost completely converted to a granular state insoluble in water.

The sulphated ore then is leached. This may be facilitated by crushing, preferably to a particle size as above described. The finely divided material is mixed with sufficient water to make a mobile slurry and agitated for about one hour. During this period a temperature of about 40° C. is developed by the exothermic hydration reaction. Then, a suitable amount of a settling agent dissolved in water is added to the warm leach slurry with thorough mixing by agitation. A suitable settling agent is an acrylamide polymer hydrolyte known as "Separan 2610." The amount of settling agent used usually is about 0.2 to 0.4 pound per ton of dry solids.

The rich liquid portion of the leach slurry is separated from the solids and the solids washed once with water by decantation. The wash liquor is mixed with the previously separated rich liquid portion to form the leach liquor from which the metal values are recovered. The solids may be subjected to additional washing, if desired, and these wash liquors may be concentrated and added to the recovered leach liquor. The leach liquor usually has a pH value not less than about 1.8 (indicating fairly complete acid consumption) with an iron content largely in the ferric state and with a nickel to ferrous iron ratio greater than about 5 to 1.

This leach liquor is essentially an aqueous solution of sulphates of iron, nickel, cobalt, manganese and magnesium. It is treated with reactive magnesia, preferably milk of magnesia, to bring its pH value to between about 3.5 to about 4.2 to precipitate the ferric iron. The resulting slurry is digested at a temperature of about 70° C. for 1 to 2 hours and allowed to settle. The clear green rich liquor is decanted off and the residue washed once with water by decantation. The wash liquor is mixed with the previously recovered rich green liquor to form the principal liquor which is treated as subsequently described to recover the metal values. The residue may be subjected to additional washing, if desired, and the wash liquors may be concentrated and added to the principal liquor. If the nickel to iron ratio in the principal liquor should be less than 5 to 1, some of the ferrous iron may be removed by careful addition of dilute milk of magnesia to pH 6.3–6.5 without serious co-precipitation of nickel. The iron precipitate may be removed by settling and decantation and finally filtering.

This principal liquor is essentially an aqueous solution of sulphates of nickel, cobalt, iron, manganese and magnesium. Reactive magnesia, either in powder or milk form, is added to this liquor to bring its pH value up to about 8.2 to precipitate a nickel concentrate. By extending this precipitation over about 1 hour and reducing the rate of addition of magnesia as the pH approaches 8.2, the nickel is practically completely precipitated (over 99.7 percent) in the form of hydroxide along with all the remaining iron and about 50 percent of the manganese with a minimum of unreacted magnesia (less than 5 percent of the dried precipitate). This precipitate settles rapidly to a dense pulp and may be efficiently washed by countercurrent decantation in four or five stages. The final underflow is filtered to obtain a concentrate containing 30 to 40 percent nickel plus cobalt after drying at about 125° C.

The stripped liquor recovered in the above nickel precipitation step, containing essentially water and magnesium sulphate and residual sulphates of iron, nickel and manganese, is partially evaporated to precipitate manganese and the remaining traces of nickel and iron as hydroxides. These are removed by settling and decantation, or by filtering, and the solution is further evaporated and then cooled to crystallize a portion of the magnesium sulphate as heptahydrate crystals. The supernatant saturated liquor is removed by filter or centrifuge and returned to the second evaporation stage.

The magnesium sulphate crystals recovered as described above are dried, first at low temperature (under 110° C.) to avoid caking in their own water of crystallization, and subsequently at 200° to 250° C. to produce the anhydrous salt. The anhydrous magnesium sulphate then is decomposed to magnesia and sulphur dioxide. One method for accomplishing this is by heating at 700° to 900° C. (preferably at or near the latter temperature) with a suitable reducing agent such as carbon or carbon monoxide. Another method for accomplishing this is by heating the anhydrous magnesium sulphate at 1000° to 1050° C. without a reducing agent. Part of the magnesia so produced may be used as a neutralant and precipitating agent in the practice of the invention, while the remainder may be retained for marketing. Sulphur dioxide, which is evolved at a concentration exceeding six percent, can be converted to sulphuric acid for use in the sulphation steps of the method of the invention.

In the method for recovering nickel from a laterite ore as previously specifically described involving a two stage sulphation of the ore before the sulphated ore is leached, the total amount of sulphuric acid used for sulphating the ore did not exceed about 80 percent by weight of that theoretically required to convert all the metal values to sulphate. More efficient use of sulphuric acid and a higher recovery of the nickel and cobalt contents of the ore may be obtained by the modified method described hereinafter.

In the modified method, a first batch of ore is subjected to a principal cycle of steps which is identical to the steps of the method previously described except that usually only one sulphating operation is used prior to leaching the sulphated material, the amount of sulphuric acid used as the sulphating agent being not more than about 80 percent and preferably not more than about 50 percent of the amount theoretically required to convert all the metal values of the ore to sulphates.

The resulting leach residue is dried and then intimately mixed with an amount of an aqueous solution of sulphuric acid so that the material will retain sufficient consistency to permit ready mechanical handling when thoroughly saturated with the aqueous solution. This acid solution contains an amount of sulphuric acid slightly greater, about 10 to 20 percent greater, than the amount theoretically required to convert to sulphates the metal values therein remaining unconverted to sulphates. The acid saturated leach residue then is dried by baking at a temperature above 100° C. but below 150° C. until the material has been dried sufficiently to permit crushing and pulverizing. The sulphated material then is crushed and leached with water or wash solution produced in the process. The leach solution is separated from the solids as previously described. The solution recovered is subjected to partial evaporation and then is cooled to precipitate sulphates of iron, nickel and magnesium. The slurry is centrifuged or filtered to remove the precipitated sulphates and obtain a clear acidic aqueous solution containing some unreacted sulphuric acid and dissolved sulphates of iron, nickel, cobalt, manganese and magnesium. This concentrated acidic solution is mixed with sulphuric acid and used as the sulphating agent for sulphating the next batch of ore prior to the leaching operation when the principal cycle of steps is repeated. The precipitated sulphates of iron, nickel and magnesium may be dissolved in the leach solution from which the concentrate of nickel and cobalt is to be recovered. By this modified method, nickel extractions in the range of 91.5 to 94.2 percent have been obtained.

The invention is illustrated further by the following specific example. Forty kilograms of dried nickel laterite ore of the following composition in percent by weight:

| Ni | Fe | MgO | Co | Mn | Cr | Al$_2$O$_3$ | SiO$_2$ | L.O.I. |
|---|---|---|---|---|---|---|---|---|
| 2.62 | 12.0 | 22.7 | 0.06 | 0.26 | 1.0 | 1.1 | 39.6 | 11.3 | were intimately mixed with 18.0 liters of 49.8° Bé. sulphuric acid (containing approximately 945 grams $H_2SO_4$ per liter) and baked for 8 hours at a temperature of 125° C. The baked ore, after crushing to minus 10 mesh was intimately mixed with 14.6 liters of 37° Bé. sulphuric acid (containing approximately 595 grams $H_2SO_4$ per liter) and again baked for 8 hours at 125° C.

The sulphated ore was then leached with water for 1 hour with agitation. Then 8 grams of "Separan 2610" dissolved in water were added to promote flocculation and the pulp was allowed to settle for 19 hours. The total amount of water used was 100 liters. From the settled ore residue 55 liters of rich leach liquor were drawn off, and to the pulp were added 70 liters of water (in practice 70 liters of wash water from a previous run would be used). After mild agitation the pulp was allowed to settle for 19 hours. From this 85 liters of dilute leach liquor were drawn off and added to the rich leach liquor to give 140 liters of leach liquor having a pH of 1.8. The ore residue, after final washing and drying, weighed 23.0 kilograms and had the following composition in percent by weight:

| Ni | Co | Mn | Fe | Cr | $Al_2O_3$ | $SiO_2$ | L.O.I. |
| --- | --- | --- | --- | --- | --- | --- | --- |
| 1.05 | 0.03 | 0.13 | 9.75 | 1.7 | 1.2 | 68.0 | 8.0 |

To this leach liquor was added slowly 2600 grams of reactive magnesia as milk of magnesia until the pH of the resulting ferric hydroxide slurry reached 4.2. After heating to 70° C. the slurry was allowed to settle for 19 hours and 100 liters of rich nickel liquor were drawn off. To the iron precipitate pulp were added 70 liters of water (in practice 70 liters of wash water from a previous run would be used) with agitation. After settling for 19 hours, 80 liters of dilute nickel liquor were drawn off and added to the rich nickel liquor to give 180 liters of solution having a pH of 2.5.

To this nickel liquor was slowly added, with agitation, 900 grams of reactive magnesia until the pH of the resulting nickel hydroxide slurry reached 8.2. After settling for 19 hours, 150 liters of rich stripped liquor were drawn off. To the nickel precipitate were added 15 liters of water (in practice 15 liters of wash water from a previous run would be used) with agitation. After settling, 35 liters of dilute stripped liquor were drawn off and added to the rich liquor to give 185 liters of stripped liquor having a pH of 8.0. After four more washing steps the precipitate was filtered and dried for 12 hours at 125° C. to yield 2.56 kilograms of nickel concentrate having the following composition in percent by weight:

| Ni | Fe | MgO | $SO_4$ | Co | Mn | $SiO_2$ | L.O.I. |
| --- | --- | --- | --- | --- | --- | --- | --- |
| 32.0 | 6.2 | 4.2 | 3.0 | 0.7 | 1.0 | 0.9 | 34.8 |

The stripped liquor, after evaporation to about half volume, was filtered to remove precipitated residual iron, nickel and manganese. Evaporation was then continued to the point of crystallization, the liquor cooled and magnesium sulphate heptahydrate crystals separated by centrifuge. The magnesium sulphate crystals were dried slowly at 105° C. to 250° C. to yield 29.1 kilograms of anhydrous salt. After intimately mixing the crystals with 2910 grams of charcoal, the mixture was fed gradually to a Herreshoff type furnace with the temperature held at 890° C., and 9.7 kilograms of magnesia were recovered. Sulphur dioxide, measured at concentrations of 11 to 32 percent, was released to the atmosphere.

I claim:

1. In a method for extracting metal values from a nickel laterite ore which is essentially an oxidic complex at least partly in hydrated form and comprising nickel, cobalt, manganese, magnesia, iron and silica, the cycle of steps comprising subjecting the ore to a sulphating operation in which the ore in finely divided form is intimately mixed with an amount of an aqueous solution of a predetermined amount of sulphuric acid about sufficient to saturate the ore and the acid saturated ore is dried by baking at a temperature above 100° C. but below 150° C. until the material has been dried sufficiently to permit crushing, said predetermined amount of sulphuric acid being not greater than about 80 percent of the amount theoretically required to convert all the metal values in the ore to sulphates, leaching the sulphated ore with a liquid selected from the group consisting of water and a water solution of magnesium sulphate to obtain a leach residue and a leach solution, and separating the leach residue from the leach solution consisting essentially of water containing dissolved sulphates of iron, nickel, cobalt, manganese and magnesium.

2. The method as claimed by claim 1 wherein said leach residue is dried and subjected to a sulphating operation in which the residue in finely divided form is intimately mixed with an amount of a second aqueous solution of sulphuric acid about sufficient to saturate said residue and the acid saturated residue is dried by baking at a temperature above 100° C. but below 150° C. until the material has been dried sufficiently to permit crushing, the amount of sulphuric acid in said second aqueous solution being slightly greater than the amount theoretically required to convert to sulphates the metal values in said residue which had not previously been converted to sulphates, leaching the sulphated leach residue with water and recovering a second leach liquor consisting essentially of water containing unreacted sulphuric acid and dissolved sulphates of iron, nickel, cobalt, manganese and magnesium, partially evaporating the second leach liquor and then cooling the same to precipitate sulphates of nickel, iron and magnesium, separating the precipitated sulphates of nickel, iron and magnesium from the concentrated aqueous acidic liquor, and treating a second batch of finely divided ore by said cycle of steps wherein said aqueous acidic liquor to which is added sulphuric acid is mixed with the finely divided ore thereby obtaining a leach residue and a third leach solution consisting essentially of water containing dissolved sulphates of iron, nickel, cobalt, manganese and magnesium.

3. The method as claimed by claim 1 wherein magnesia is added to said leach solution to bring its pH value to between about 3.5 to about 4.2 thereby precipitating ferric hydroxide, separating the ferric hydroxide precipitate to obtain an aqueous solution consisting essentially of water and dissolved sulphates of nickel, cobalt, iron, manganese and magnesium, adding magnesia to the last mentioned aqueous solution to bring its pH value up to about 8.2 thereby precipitating substantially all its nickel and cobalt contents as hydroxides, and separating the nickel and cobalt precipitate from the solution comprising essentially water and dissolved sulphates of manganese, magnesium and residual iron and nickel.

4. The method as claimed by claim 2 wherein magnesia is added to said third leach solution to bring its pH value to between about 3.5 to about 4.2 thereby precipitating ferric hydroxide, separating the ferric hydroxide precipitate to obtain an aqueous solution consisting essentially of water and dissolved sulphates of nickel, cobalt, iron, manganese and magnesium, adding magnesia to the last mentioned aqueous solution to bring its pH value up to about 8.2 thereby precipitating substantially all its nickel and cobalt contents as hydroxides, and separating the nickel and cobalt precipitate from the solution comprising essentially water and dissolved sulphates of manganese, magnesium and residual iron and nickel.

5. The method as claimed by claim 3 wherein the solution comprising essentially water and dissolved sulphates of manganese, magnesium and residual iron and nickel is subjected to partial evaporation to precipitate manganese, iron and nickel, separating the precipitate to obtain a solution consisting essentially of water and dissolved magnesium sulphate, subjecting the last mentioned solution to further evaporation and then cooling the same to precipitate crystals of magnesium sulphate, and recovering the magnesium sulphate crystals.

6. The method as claimed by claim 4 wherein the solution comprising essentially water and dissolved sulphates of manganese, magnesium and residual iron and nickel is subjected to partial evaporation to precipitate manganese, iron and nickel, separating the precipitate to obtain a solution consisting essentially of water and dissolved magnesium sulphate, subjecting the last mentioned solution to further evaporation and then cooling the same to precipitate crystals of magnesium sulphate, and recovering the magnesium sulphate crystals.

References Cited in the file of this patent

UNITED STATES PATENTS

| | | |
|---|---|---|
| 1,528,209 | Greenawalt | Mar. 3, 1925 |
| 2,111,951 | Thomsen | Mar. 22, 1938 |
| 2,151,261 | Bartlett | Mar. 21, 1939 |